United States Patent [19]

Aronson

[11] 3,847,191

[45] Nov. 12, 1974

[54] MEANS AND METHODS FOR MEASURING AND DISPENSING EQUAL AMOUNTS OF POWDERED MATERIAL

[76] Inventor: Theodore F. Aronson, 2108 Sunrise Key Blvd., Fort Lauderdale, Fla. 33304

[22] Filed: Apr. 11, 1973

[21] Appl. No.: 350,145

Related U.S. Application Data

[63] Continuation of Ser. No. 174,022, Aug. 23, 1971, abandoned.

[52] U.S. Cl.................... 141/12, 141/67, 141/71, 53/24, 53/124 D
[51] Int. Cl............................................. B65b 1/26
[58] Field of Search........... 141/1, 8, 12, 34, 67, 68, 141/71–81; 93/1 C; 53/24, 124 D

[56] References Cited
UNITED STATES PATENTS
2,381,454   8/1945   Huth................................ 53/124 D Primary Examiner—Houston S. Bell, Jr.
Attorney, Agent, or Firm—Edgar N. Jay

[57] ABSTRACT

A process and apparatus are disclosed in which powdered material is compacted to a predetermined density by suction applied to the bottom of a supply trough and then doctored to a predetermined level. A measured charge of the compacted and leveled powder is then taken up by inserting a filling gun into the powdered material. The filling gun and the container to be filled with the measured charge are then brought into registration and the measured charge is delivered to the container. Powdered material is added to the supply trough as required so that the required level can be maintained. When desired, the powder can be agitated as by means of an air stream supplied as a counter flow through the bottom of the supply trough. The measured charge can also be further compacted before being discharged by advancing the piston of the filling gun while the open end of the gun is against an obstruction.

12 Claims, 6 Drawing Figures

INVENTOR.
THEODORE F. ARONSON

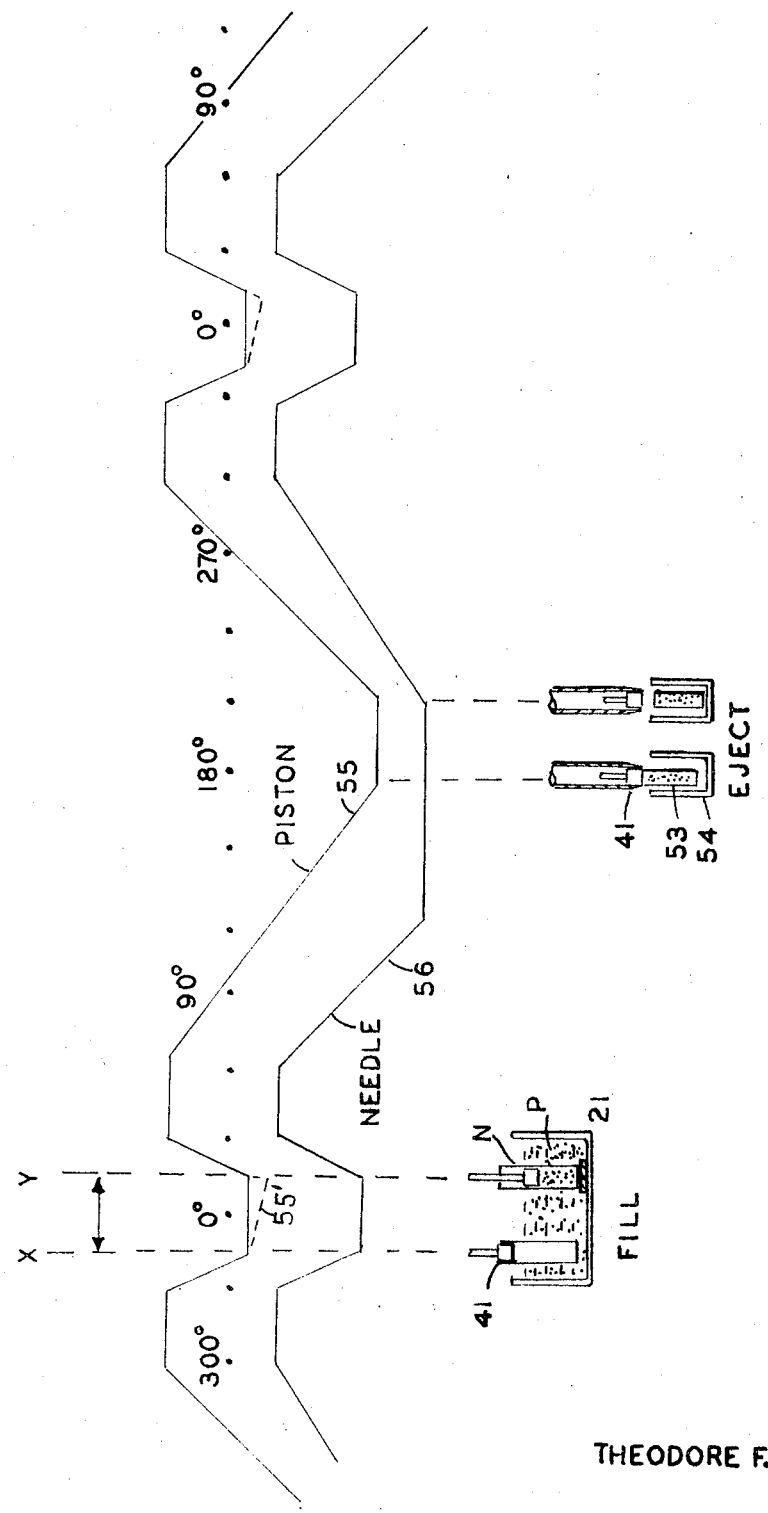

MEANS AND METHODS FOR MEASURING AND DISPENSING EQUAL AMOUNTS OF POWDERED MATERIAL

CROSS REFERENCES

This application is a Continuation of my copending application filed Aug. 23, 1971, Ser. No. 174,022, now abandoned.

This invention relates to a method and apparatus for volumetrically measuring and delivering charges of powder material and more particularly to such a method and apparatus for carrying out the same in which a gaseous pressure medium is used to control the density of a measured volume of the powder material.

BACKGROUND OF THE INVENTION

Considerable effort has been expended in the past to improve the efficiency and accuracy of the volumetric measurement of the powder material and inserting the same into containers. The use of suction to draw powder into a fixed volume chamber from which it is ejected by an over pressure is disclosed in U.S. Pat. No. 2,540,059. However, such equipment left much to be desired. For example, some difficulties were encountered in maintaining consistent results and also in meeting the increasingly critical limits imposed on the contents of containers. In addition, the use of gas pressure to discharge the powder charge from the measuring chamber into the container left much to be desired.

In accordance with the invention set forth in my copending U.S. Pat. No. 3,656,518, granted Apr. 17, 1972, improved measuring accuracy, reproducability and more efficient delivery of the measured charge are provided by means of a piston reciprocally mounted in the measuring gun, the piston being pervious to a gaseous pressure medium but impervious to the powder material. The charge of powder material is sucked into the measuring chamber where it is packed to a predetermined density by the suction. When it is desired to deliver the measured powder charge to its container, the piston is advanced to eject the charge. When desired, the piston can be advanced a predetermined amount after the powder has been taken into the measuring chamber and before it is ejected for the purpose of further compacting the charge. At the time of the compacting stroke of the piston, the end of the chamber is closed by an anvil. In addition to providing improved measurment accuracy, that arrangement had the further advantage of making possible piston delivery of the powder charge combined with air pressure at the end of the piston stroke to ensure complete separation of the charge from the piston and delivery into the container while avoiding most of the drawbacks of using gas under pressure to deliver the charge to the container.

In practice, whatever form such apparatus took, whether the porous pistons and measuring chambers are arranged in a wheel or turret as in my said copending U.S. Pat. No. 3,656,518, or as a horizontal array of a plurality of measuring guns as is also shown and described in said co-pending application, the relatively small porous members forming the pistons in the measuring chambers tended to become clogged with the powder material, particularly when the porous piston head is used to further compact the powder charge. When blocked to the extent that even counter blowing at relatively high pressure failed to clear them it then was necessary to disassemble the apparatus and fix each gun individually. This entailed a considerable amount of time and work. But an even more serious problem resides in the fact that unless great care was exercised the equipment would be operated with the pistons clogged to a sufficient extent to adversely affect the accuracy of measurment so that the error could be as great as plus or minus 20 percent of the desired amount.

SUMMARY OF THE INVENTION

In carrying out the present invention a supply of powder material is compacted to a predetermined density by suction in the supply trough and doctored to a predetermined level so that the powder is compacted to the required density and depth. A measured charge of the thus compacted and leveled powder is then taken up by inserting a filling gun into the powder material. The filling gun and the container to be filled are then brought into registration and the measured powder charge is delivered to the container.

In accordance with another feature of the invention, the powder material is subjected to air pressure to agitate and, in the case of powders of relatively fine particles size or which tend to cake, to fluff-up the powder material. The powder is then subjected to suction and doctored.

The disturbed area of the supply from which the measured charge was removed can be restored to the desired condition by agitating the powder in the trough and adding powder to restore its level. When the powder material is to be periodically subjected to a counter air flow then the suction is removed from the powder, at least in the vicinity of where the gun is to be inserted, and after the measured charge is removed it is subjected to a counter air flow by a suitable medium at a pressure high enough to agitate an aerate the material before it is once again connected to suction.

A modified mode of operation is as follows:

After the charge is in the measured cylinder and while it is still in contact with a rubber strip placed in the trough, the piston can be brought closer, to further compress the charge at this point before it is withdrawn from the trough. The piston is preferably solid (i.e., not porous) so to facilitate separating the charge from it at the ejection point without a puff of air. This arrangement does not cause the clogging of any piston filters such as used in the prior art.

It is therefore a principal object of this invention to provide a volumetric measuring and delivering system for powder material as well as apparatus for carrying out the same in which suction is utilized to ensure improved uniformity in the density of the powder material being measured out and thereby improved volumetric uniformity and accuracy, while substantially if not entirely eliminating filter or porous body-clogging as a cause of loss of accuracy in use and break down.

Another more specific object is to provide such a system and apparatus in which suction is applied to the powder material to bring it to a desired compactness before it is taken into the measuring chamber to form a measured charge.

Another object is to provide new and improved means for measuring and dispensing powdered materials comprising a container adapted to hold powdered material, a porous filter mounted in the bottom of said container, a source of vacuum connected to the bottom of said filter to compact said powder in said container, a filling gun comprising an elongated hollow member and means to insert said gun into said container to charge said gun.

Another object is to provide new and improved method of measuring and dispensing powdered materials comprising the steps of; placing said powdered material in a container, applying a source of vacuum to the bottom of said container to compact said powder, inserting a filling gun into said container to charge said gun with said compacted powder.

A further specific object is to provide such a system and apparatus for carrying out the process wherein the compacted powder material after being taken into the measuring chamber is readily further compacted.

BRIEF DESCRIPTION OF THE DRAWINGS

These and other objects of the invention will be apparent from the following specifications and drawings of which.

FIG. 5 is a developed cam diagram.

FIGS. 1 and 1A show a prior method of measuring and dispensing powder as shown in my aforesaid prior co-pending patent. The powder P is contained in the trough 10 and is preferably mechanically levelled. The filling gun comprises a hollow cylindrical member 11, which has a porous piston head 12. The upper end of the cylinder 11 is connected to a source of vacuum. The porous piston head is impervious to the powder but will pass air. The piston head can be adjusted to provide a desired powder volume.

A vacuum is applied through the porous piston 12, which causes the material to be drawn into the cylinder from the bulk supply trough 10. Since the porous piston passes air but not material, a compacted slug 13, of material is formed in the cylinder by the vacuum.

When the cylinder is withdrawn from the bulk trough, a mushroom of powder will come up with the filled cylinder. This mushroom is formed by the powder particles acting under the influence of the applied vacuum. The excess powder is doctored off the end of the cylinder and falls back into the powder supply.

Figure 1:
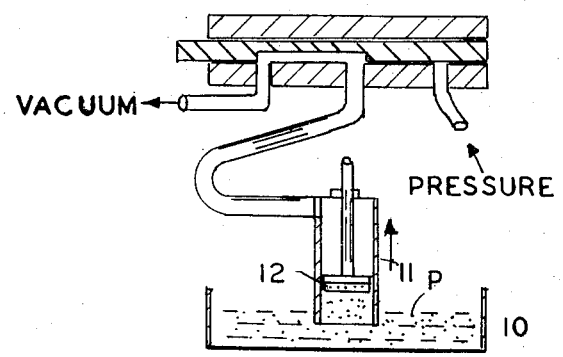
FIGS. 1 and 1A show the prior system.
Figure 1A:
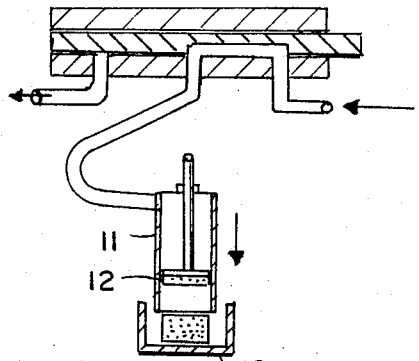

The powder slug formed is then discharged by replacing the vacuum behind the porous filter with a slight, short pulse of very low pressure air, FIG. 1A.

The vacuum impaction noted above forms the powder to such a uniform density without any voids, that the system's accuracy is always guaranteed gravimetrically even though it is a volumetric filler.

As previously described, the difficulty with the porous piston head is that ultimately the powder blocks the pores of the piston filter and prevents the passage of air so that the machine has to be disassembled and the piston heads replaced.

Figure 2:
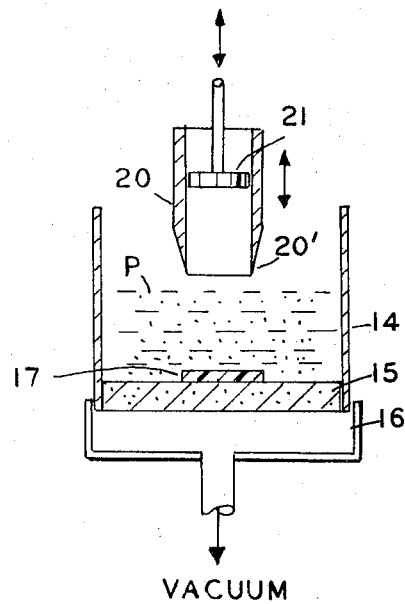
FIG. 2 is a vertical cross sectional view of an embodiment of the invention.

FIG. 2 shows one preferred embodiment of carrying out the present invention. In this case a trough 14 has a porous filter bottom 15, which is connected to a source of vacuum by means of the vacuum valve trough 16. The level of the powder in the trough 14 is mechanically controlled, for instance, by a knife or doctor blade and the powder conditioning is preferably carried out by aeration and/or agitation. On the central area of the bottom trough 14, is mounted a solid rubber or plastic strip 17, against which the filling gun will strike. The powder is compacted by the vacuum to a predetermined density. By controlling the level of the powder, the amount of powder lifted out can be accurately controlled.

The filling gun as shown comprises a hollow preferably cylindrical member 20 with a mechanically operated piston, 21. In order to fill the gun, the gun is lowered against the strip 17 thereby filling up the open end of the gun 20. The volume being determined by the level of the powder, and the inside diameter of the gun 20. The gun is then withdrawn with a measured charge of compacted powder. The leading edge of the gun member 20, preferably has a sharp lip 20' to facilitate accurate measurement. Further compaction when desired of this measured charge may be made by moving the piston closer to the bottom of the trough during the time that lip 20' remains in contact with strip 17. The gun is then moved to some predetermined position and the piston is moved further to eject the plug into a capsule or other desired container.

Figure 3:
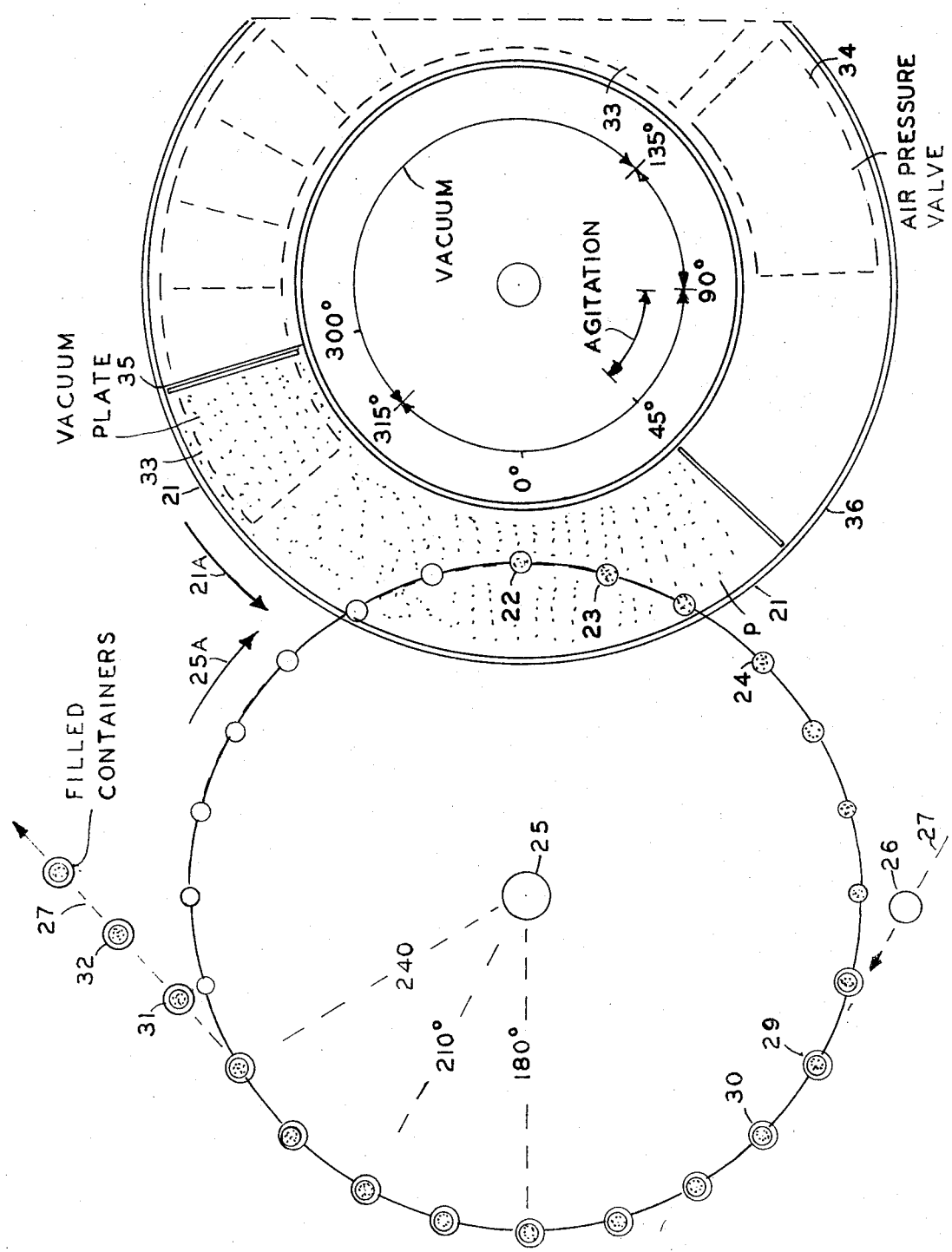
FIG. 3 is a top view of another embodiment of the invention.

FIG. 3 shows another preferred embodiment of this invention especially suited for high speed automatic filling of containers, where the trough 21, is circular and rotatably mounted. The filling guns 22, 23, 24 etc., are mounted on a turret 25, so that the array formed by the filling guns overlaps a portion of the rotatable trough 21. The turret and the trough are rotated in synchronism as indicated by the directions of the arrows 25a, 21a. Empty containers 26, may be fed on a chain 27, so as to ride under the filling guns 29, 30 etc. While the container are riding under the guns, the guns are emptied and the filled containers 31, 32 etc., are taken away by the chains 27. The chain may carry capsules, bottles or other containers as shown in my prior U.S. Pat. Nos., 3,427,105 and 3,534,526.

In FIG. 3, in order to facilitate the description, various portions have been designated in degrees from 0° to 360°, representing one full revolution of the powder turret and the filling gun turret.

The vacuum is applied to the bottom of the trough 21 by means of a vacuum enclosure 33, which extends from 135° to 315° of the trough 21, shown in FIG. 3. The vacuum enclosure is stationary underneath the moving trough 31 and is connected to a source of vacuum and functions as a valve to supply vacuum through the filter bottom 15 of the trough 21, thereby serving to compact the powder to a predetermined density. In the area from 90° to 135° positive pressure is applied through the filter 15, by means of an enclosure 34, connected to a source of air pressure for the purpose of aerating the powder. A cover 36, extends from 45° to 300° counter-clockwise as viewed in FIG. 3 and at the 300° mark is mounted a vertically adjustable gate 35 which is used to set the powder level in the trough 21 and smooth the upper surface of the powder. A powder supply hopper is preferably incorporated in the cover. The area from 315° through 45° counter-clockwise is open to atmospheric pressure and in this area the path traced out by the filling guns overlies the trough 21 where they are lowered into the trough to pickup the powder. The trough preferably has compartments to prevent vacuum bleeding.

Figure 4:
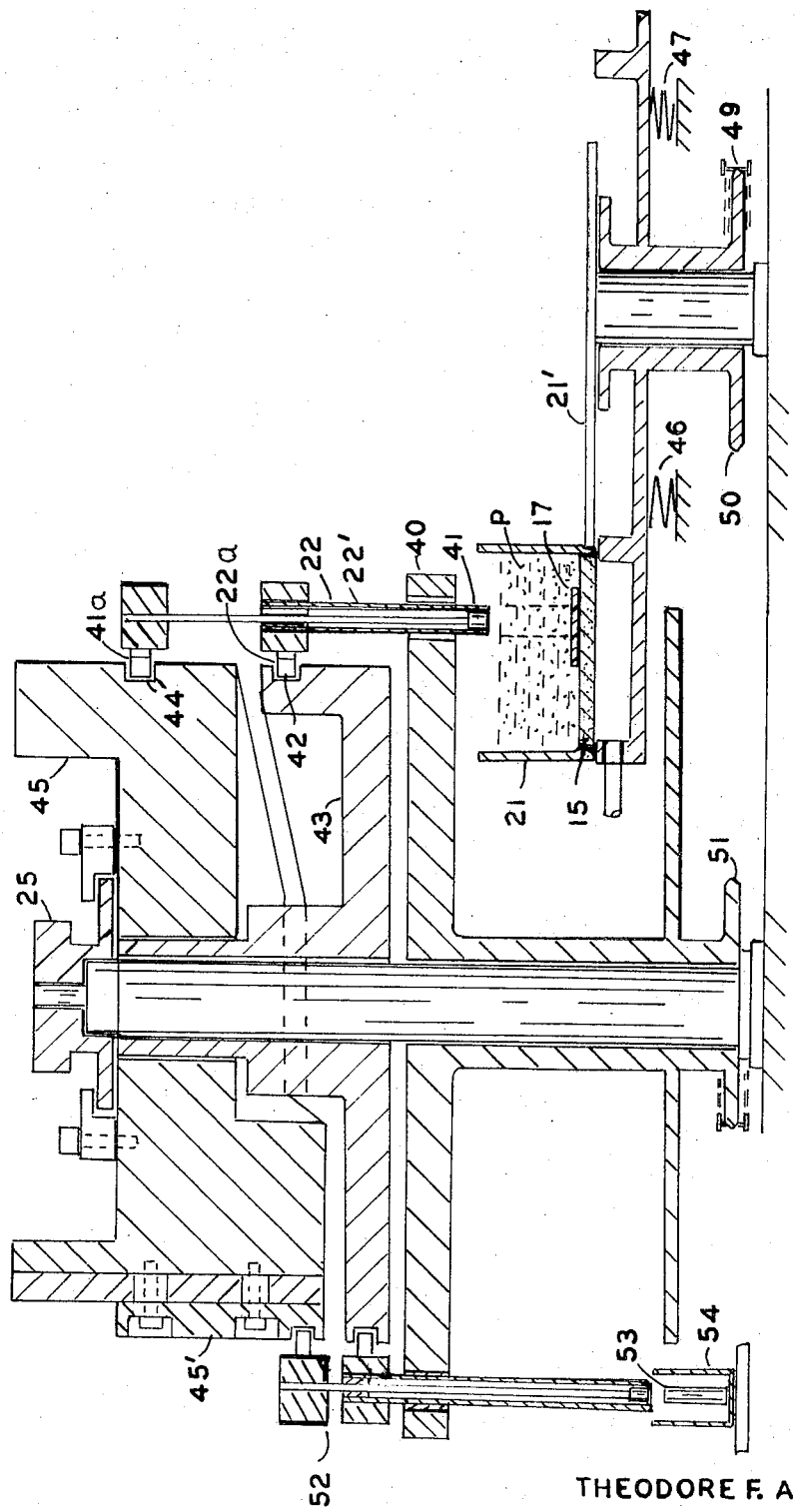
FIG. 4 is a side view of FIG. 3.

FIg. 4 shows a cross sectional view of FIG. 3. In the filling gun turret 24, the filling guns or needles, are mounted on the rotatable member 40. Each gun assembly 22, consists of a hollow member 22' in which is mounted a piston 41. The outer casing 22' has a cam follower 22a which rides in a cam slot 42 in the stationary circular cam plate 43. The piston 41 has a cam follower 41a which rides in a slot 44 in the stationary circular cam plate 45.

The filling gun assembly 22 is shown in position to be charged over the trough 21. The piston 41 is retracted and the outer member 22' is about ot be lowered into contact with the rubber strip 17. At the bottom of the rotating trough 21, the filter 15, extends across the remaining surface of the trough bottom and is sealed to the vacuum valve plate 33, which is spring loaded against the underside of the trough 21 by means of the springs, 46 and 47. The trough 21 is mounted on the rotatable table 21' which is driven by chain 49, which is connected to sprocket 50. The filling gun table 40 is rotatably mounted and is driven by a chain 49' engaging sprocket 51. The filling gun assembly 52 is shown in position ejecting the powder slug 53 into the container 54. The container 54 may be capsule, bottle or any suitable container which is fed into the filling position by means of a chain drive or other equivalent drive as discussed in connection with FIG. 3.

The operation cycle is as follows:

In the area of 345° through 0° to about 15° the filling guns are charged and the charge compacted as the trough rotates counterclockwise. In the area from 45° to 90° mechanical plowing or agitation is preferably introduced to fluff up the powder. In the area from 90° to 135° positive air pressure is provided through the valve 34 to aerate the powder, to give it a fluffy texture. From 135° to 315° vacuum is applied to the bottom of the trough through vacuum valve plate 33, and additional powder is fed as required from the powder supply incorporated in cover 36. The vacuum causes the powder to compact. At approximately 300°, the adjustable gate 35, levels off the two powder surface to the desired height. After 315° the trough is open to atmospheric pressure and the filling guns pass over it.

FIG. 5 shows a developed cam diagram. The piston cam slot 44 is represented by line 55 shown on top and the filling gun needle cam slot 42 is represented by line 56, shown underneath. At just before 0° the gun shown on the left is depressed into the powder P in the trough 21. As rotation proceeds in this area from X° to Y° the further compaction can take place as shown by the dotted line dip of cam slot 55' from X° to Y°. In the area from 15° to 30° the filling guns are lifted up out of the trough and a partial vacuum is formed in the gun from about 60° to 120°, which helps keep the powder in position in the gun N, by withdrawing the piston in the gun thereby creating the vacuum. More specifically from 60° to 90° the gun is lowered faster than the piston. In the area 90° to 180° the piston comes down and ejects a powder slug 53 into the container 54 shown in two successive positions. From about 210° through near 360° the gun is raised and the piston is retracted and at the area 330° the gun is in position to be lowered for another charge of powder. The cam plates are preferably made with adjustments 45' so that the relative positions of the piston and gun can be adjusted at various portions of the cycle.

The above is one of the systems that can be used, however, the invention can take many different forms and modifications are not limited to the present system described.

The pistons and measuring guns may be made of non-metallic material to avoid metal to metal contact when handling explosive powder.

I claim:

1. Apparatus for measuring and dispensing a predetermined volume of powdered material, comprising a supply container for powdered material, means for applying suction to powdered material in said supply container to compact said powdered material to a predetermined density, means for maintaining the depth of said powdered material in said supply container at a predetermined level, means including an open ended measuring member and for inserting said measuring member into said compacted and leveled powdered material to a predetermined depth to charge said measuring member with a predetermined volume of said compacted material and means for discharging said predetermined volume of said compacted material from said measuring member.

2. Apparatus for measuring and dispensing a predetermined volume of powdered material, comprising a supply container, means for delivering powdered material to said supply container, means including an open ended measuring member defining a predetermined volume, means for sequentially
   a. applying suction to the powdered material in said supply container to compact said powdered material to a predetermined density,
   b. maintaining the depth of said compacted powder material in said supply container at a predetermined level, and
   c. inserting said measuring member into said compacted and leveled powdered material to a predetermined depth and for charging asid measuring member with a predetermined volume of said compacted material, and means for discharging said predetermined volume of said compacted material from said measuring member.

3. Means for measuring and dispensing powdered materials comprising: a supply container for holding powdered material; means for compacting said powdered material to a predetermined density in said supply container comprising a porous filter mounted in said supply container for supporting powdered material on the upwardly presented surface of said filter in said supply container, and means for applying suction to the undersurface of said filter to compact said powdered material to a predetermined density; means for controlling the level of said powdered material in said supply container; at least one measuring gun comprising an elongated hollow member; means for inserting said gun into said material in said supply container a predetermined distance into said supply container to charge said gun; and means for ejecting said compacted powder material from said gun.

4. Apparatus as in claim 3 comprising means for moving the powdered material in said supply container, so that portions of said powdered material pass successively through a first area and a second area, means in said first area to aerate and agitate the powdered material, and said means for applying suction being in said second area 5. Apparatus as in claim 4 wherein said supply container is a rotatable trough, and further comprising a rotatable turret, a plurality of said measuring guns being mounted on said turret, means for rotating said turret so that said measuring guns extend said trough during a portion of each rotation of said turret.

6. Apparatus as in claim 5 including means for moving said measuring guns downwardly into said trough to be charged by powder in said trough and then retracted said measuring guns from said trough.

7. Apparatus as in claim 6 further comprising a piston in each of said measuring guns means for moving each of said pistons up and down in said measuring guns so that each piston is in its retracted upward position when its gun is being charged and is thereafter moved downwardly to eject the compacted powdered material from its gun.

8. Apparatus as in claim 7 further comprising means for activating each of said pistons when its gun is in charging position to further compact said powder.

9. The method of measuring and dispensing a predetermined volume of powdered material, comprising the steps of: placing powdered material in a supply container, applying suction to the powdered material in said supply container to compact said powdered material to a predetermined density, maintaining the depth of said powdered material in said supply container at a predetermined level, inserting a measuring member into said compacted and leveled powdered material to a predetermined depth to charge said measuring member with a predetermined volume of said compacted material, and discharging said predetermined volume of said powdered material from said measuring member.

10. The method of measuring and dispensing a predetermined volume of powdered material, comprising the steps of: delivering powdered material to a supply container having a porous body for supporting said powdered material, applying suction to the powdered material in said supply container through said porous body to compact said powdered material to a predetermined density, maintaining the depth of said compacted powdered material in said supply container at a predetermined level, and inserting an open ended measuring member into said compacted and leveled powdered material to a predetermined depth and charging said measuring member with a predetermined volume of said compacted material, and discharging said predetermined volume of said powdered material from said measuring member.

11. The method as set forth in claim 10 in which the predetermined volume of powdered material is further compacted while in said measuring member.

12. The method as set forth in claim 10 in which before suction is applied to said porous body a flow of fluid counter to said suction is forced through said porous body to agitate said powdered material before it is compacted.

* * * * *

UNITED STATES PATENT OFFICE
CERTIFICATE OF CORRECTION

Patent No. 3,847,191    Dated November 12, 1974

Inventor(s) Theodore F. Aronson

It is certified that error appears in the above-identified patent and that said Letters Patent are hereby corrected as shown below:

Column 2, line 39, for "an" read -- and --;
         line 42, for "measured" read -- measuring --.
Column 4, line 38, delete "s" after "chain".
Column 5, line 15, insert "it" after "and";
         line 42, for "two" read -- top --.
Column 6, line 39, in claim 2, for "asid" read -- said --;
         line 66, in claim 4, for "the" read -- said --.
Column 7, line 5, in claim 5, insert "over" after "external";
         line 9, in claim 6, for "retracted" read -- retracting --.

Signed and sealed this 18th day of February 1975.

(SEAL)
Attest:

RUTH C. MASON
Attesting Officer

C. MARSHALL DANN
Commissioner of Patents
and Trademarks